Feb. 21, 1961 W. C. WOOTTON 2,972,367

FASTENING DEVICE

Filed July 18, 1957 3 Sheets-Sheet 1

INVENTOR:
WILLIAM G. WOOTTON,
BY Walter S. Jones
ATTORNEY.

Feb. 21, 1961 W. C. WOOTTON 2,972,367

FASTENING DEVICE

Filed July 18, 1957 3 Sheets-Sheet 2

INVENTOR:
WILLIAM C. WOOTTON,

BY Walter S. Jones
ATTORNEY.

INVENTOR:
WILLIAM C. WOOTTON,
BY Walter S. Jones
ATTORNEY.

2,972,367

FASTENING DEVICE

William C. Wootton, San Leandro, Calif., assignor to United-Carr Fastener Corporation, Cambridge, Mass., a corporation of Delaware Filed July 18, 1957, Ser. No. 672,623
3 Claims. (Cl. 151—69)

This invention relates generally to fastening devices and has particular reference to a rotary operated fastening device for use in fastening superposed panels and like structures and specifically adapted for use on curved surfaces.

In the construction of aircraft, it has been found desirable to design the air frame so that the outer sheet metal covering provides part of the structural strength. At spaced intervals along the surface of the aircraft, access panels must be provided to inspect guns, hydraulic equipment and to service propulsion mechanism. However, since the panels, when in place, provide a portion of the structural strength of the air frame, they must be provided with a multiplicity of strong and reliable fastening means for attachment to the main body of the air frame. Due to the curved surfaces that are presented on modern aircraft, difficulty has been experienced in installing curved access panels as a result of the protruding studs interfering with the proper alignment of the panels.

This invention provides a stud and bushing assembly for retention in the outer panel in which the assembly is readily retractable so as to present a minimum of interfering stud surfaces. In addition, this fastener eliminates the necessity of reinforcing the panel frame with stiffening members by providing retractable bushings with the resultant weight saving feature and furthermore adapted to resist the shear stresses created between the panels and the main body of the aircraft.

The object of this invention is to provide a fastening device for attaching curved panels to curved aircraft surfaces, one of whose components is a retractable stud assembly providing for correct alignment of the panels.

Another object of this invention is to provide a fastening device having a retractable stud assembly in one panel adapted for positive engagement with a floating friction lock socket assembly in another panel.

A further object of this invention is to provide a series of fastening devices for use in attaching superposed panels having retractable components which when retracted provide means for grasping the panels during the installation operation.

Other objects of the invention will, in part, be obvious, and will, in part, appear hereinafter.

Figures 1, 2, 3, 4, 5, 6, 7, 8:
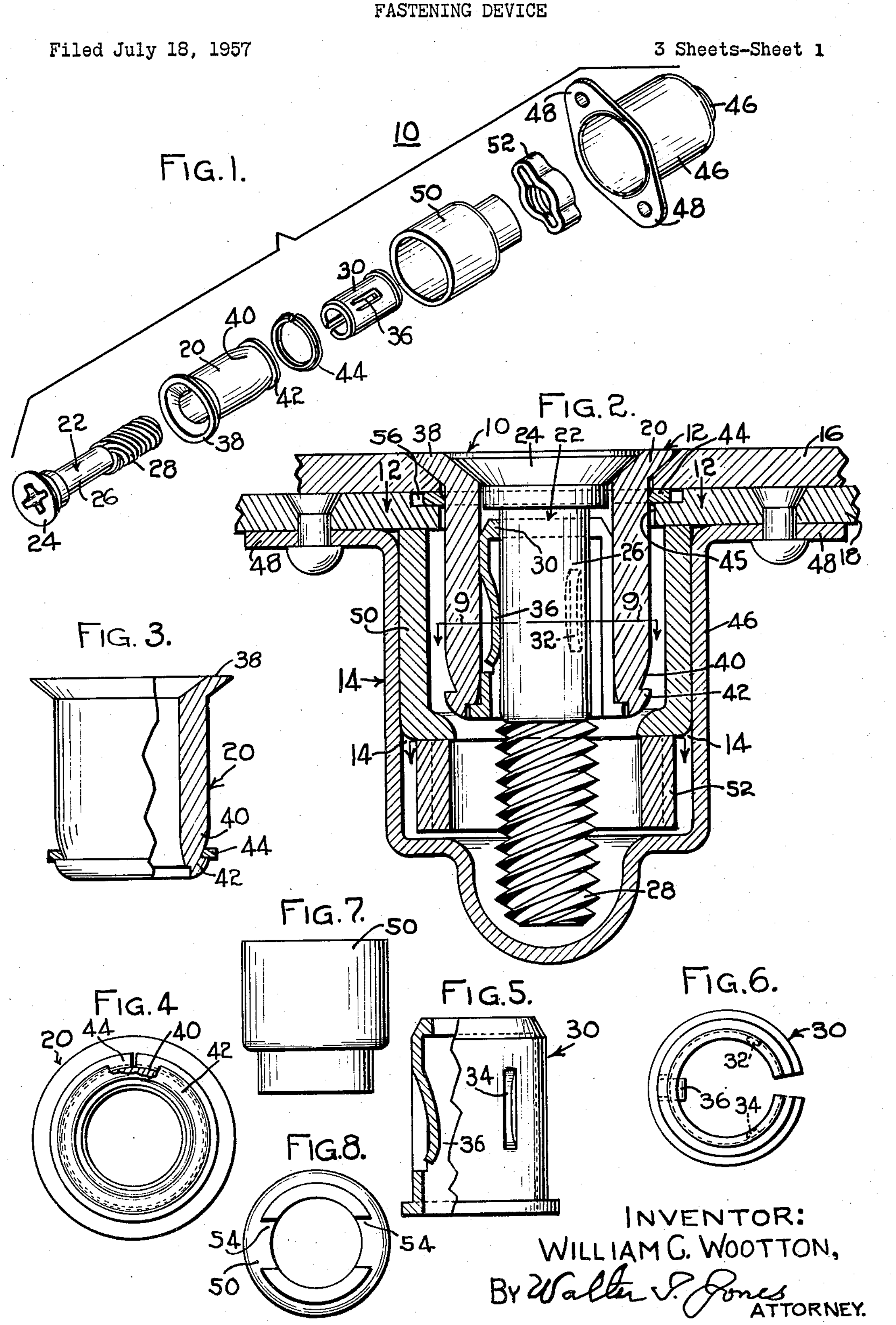
Fig. 1 is an exploded view of the fastener.
Fig. 2 is a view in elevation, partly in section of the stud and socket assembly with the stud member engaging the friction lock nut.
Fig. 3 is a view in elevation of the stud bushing.
Fig. 4 is a bottom plan view of Fig. 3.
Fig. 5 is a view in elevation of the stud retaining bushing.
Fig. 6 is a bottom plan view of Fig. 5.
Fig. 7 is a view in elevation of the friction nut retaining bushing.
Fig. 8 is a bottom plan view of Fig. 7.
Figure 9:
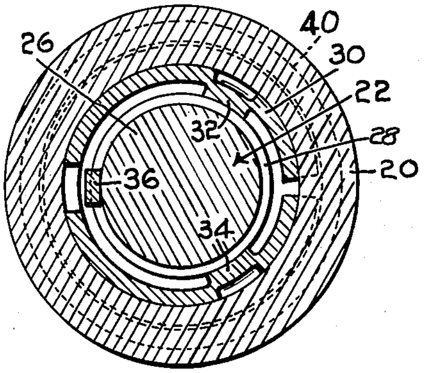
Fig. 9 is a view in section taken on line 9—9 of Fig. 2.

Referring to the drawing there is illustrated a panel fastener 10, comprising a retractable stud assembly 12 and a socket assembly 14 adapted for assembly onto panels 16 and 18 which are to be superposed, to fasten the panels together.

The retractable stud assembly comprises a bushing 20, assembled into an opening in the panel 16, a stud 22 extending through the bushing and movable axially thereon which has a head 24, disposed on one side of the panel 16, a shank portion 26 and a threaded portion 28 protruding from the other end. Disposed within the stud bushing 20 is a spring retaining bushing 30 having centering detents 32 and 34 adapted to functionally engage the threaded portion of the stud 28 by engagement of the spring arm 36 with the threads 28 and retain it in the retracted position. The bushing 20 is provided with a retaining flange 38 for bearing against the upper surface of the panel 16, a neck portion 40 at the other end, a radially projecting stop portion 42 forward of the neck portion 40 and a resilient retaining ring 44 gripping the bushing 20 and being slidable longitudinally thereon, the ring 44 adapted to constrict into the neck portion 40 when slid to the forward end of the bushing 20 and further movement prevented by the stop portion 42.

The socket assembly 14 is adapted to be assembled onto the lower side of the panel 18 opposite an opening 45 and comprises generally a hollow receptacle 46 having laterally extending panel attaching portions 48, a nut retaining bushing 50 disposed within the hollow receptacle 46 adapted to allow a friction lock nut 52 to float within cutout portions 54 of the nut retaining bushing 50.

Figure 16:
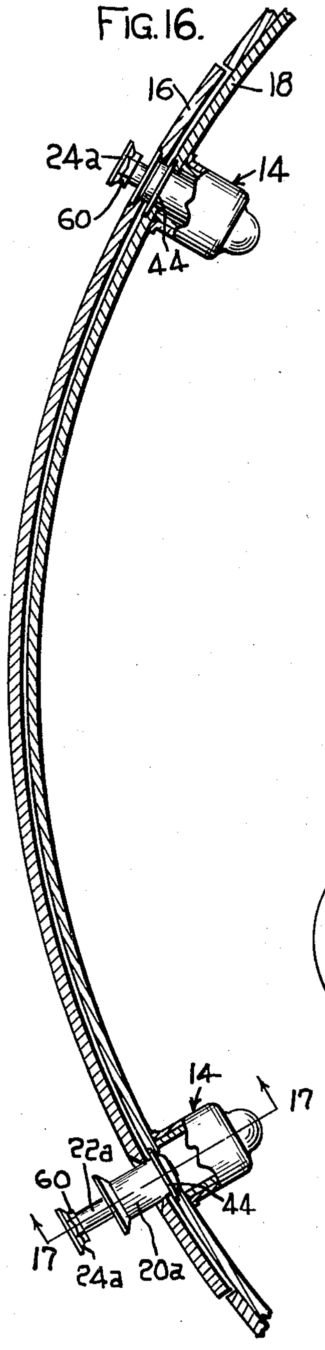
Fig. 16 is a section in elevation showing the application of a modified form of the fasteners to curved surfaces.

In Fig. 16, there is illustrated a complete panel section 16 superposed over an opening in the aircraft skin showing the ready retractability of the stud to allow the two curved surfaces 16 and 18, one of which has the stud and bushing assembled therein, to be superposed without interference from protruding studs.

Figure 10:
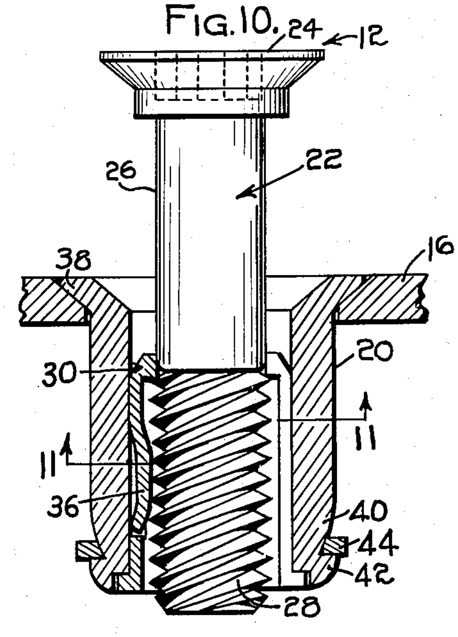
Fig. 10 is a view in elevation, partly in section of the stud assembly with the stud in the retracted position.
Figure 11:
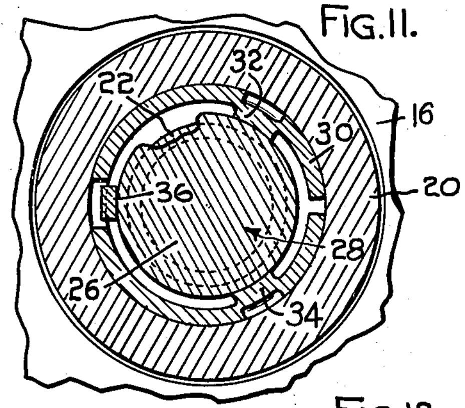
Fig. 11 is a view in section taken on line 11—11 of Fig. 10.
Figure 12:
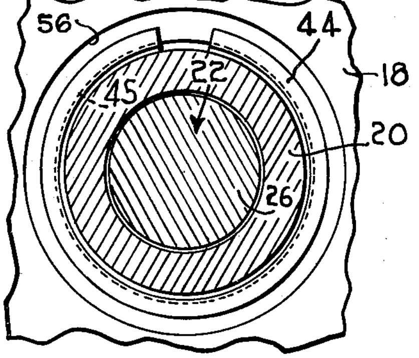
Fig. 12 is a view in section taken on line 12—12 of Fig. 2.
Figure 14:
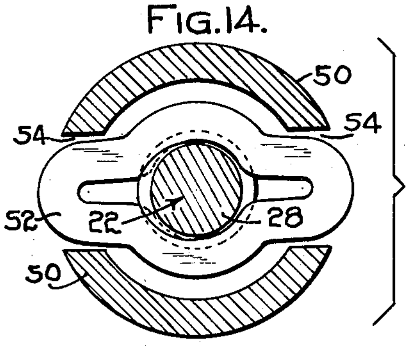
Fig. 14 is a view in section taken on line 14—14 of Fig. 2.
Figure 15:
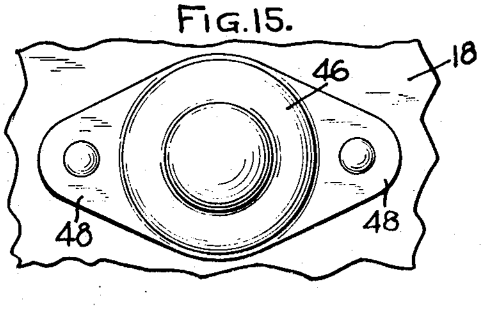
Fig. 15 is a bottom plan view of the socket assembly.
Figure 13:
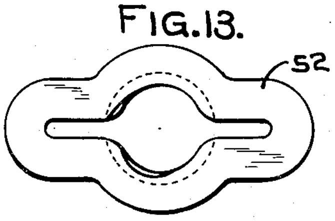
Fig. 13 is a bottom plan view of the friction lock nut.

To assemble the panels by means of the illustrated fastener the panels are superposed so that the bushing 20 is aligned over the opening 45 in the lower panel 18, the stud 22 in the retracted position as shown in Fig. 10 with the bushing 20 drawn upward so that the resilient retaining ring 44 is constricted into the neck portion 40. The bushing 20 is then pushed into the hollow receptacle 50 of the socket assembly 46, the resilient retaining ring 44 sliding on the bushing 20 until it bears against the under side of the panel 16. The panels 16 and 18 come together with the resilient ring 44 retained within the space 56. The stud 22 is forced downward against the frictional resistance of the spring arm 36 of the stud retaining bushing 30 by pushing it with a screw driver or other tool, rotation in a clockwise direction causes the screw to lock in threaded engagement with the friction lock unit 52.

To disassemble the panels the stud is rotated in an opposite or counter clockwise direction. Since the nut 52 is held between the cut-out portion 54 of the nut retaining bushing 50 the stud will experience retrograde rotation and back out of threaded engagement. Manually drawing the stud upward, will cause the stud to be retracted within the stud bushing 20 until the spring 36 engages the threaded portion of the stud. Furthermore the bushing 22 will be retracted by the resilient retaining ring 44 sliding forward into the neck portion as the bushing is drawn upward through the panel 16 as ring 44 bears against the under surface of the panel.

Since the bushing 20 extends through both plates 16 and 18 it is capable of resisting the alternate tension and compression stresses created by the aircraft at high speeds on the panels and which are transmitted by the fastener back into the stressed skin structure of the aircraft body.

Figure 17:
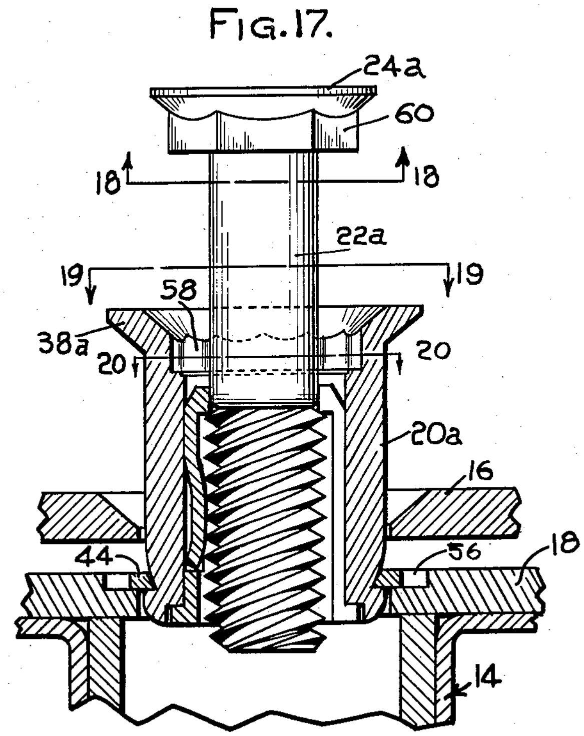
Fig. 17 is a view in elevation, partly in section showing a modified form of the stud and bushing assembly.
Figure 18:
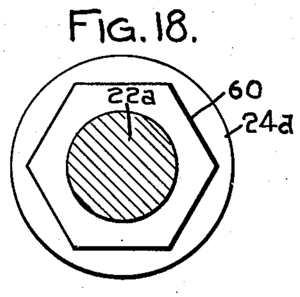
Fig. 18 is a view in section taken on line 18—18 of Fig. 17, showing a modified form of the bushing assembly.
Figure 19:
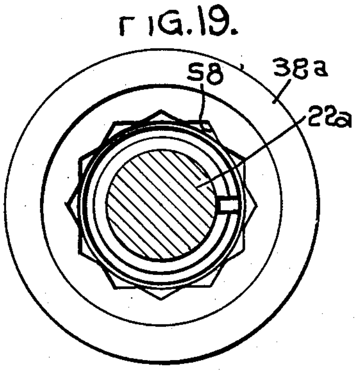
Fig. 19 is a view in section taken on line 19—19 of Fig. 17, showing a modified form of the bushing assembly.
Figure 20:
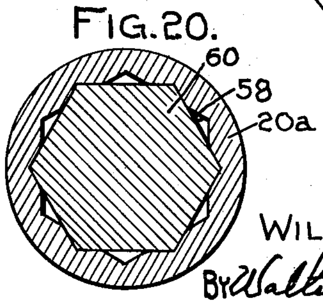
Fig. 20 is a view in section taken on line 20—20 of Fig. 17, showing the bolt in engagement with the bushing.

A modified design as shown in Figs. 17, 18 and 19 depicts the bushing **20*a* having a serrated socket 58 broached in the retaining flange 38*a* adapted to cooperate with an hexagonal or the like shoulder 60 formed under the head 24*a* of the stud 22*a*. As the fastener is rotated in a clockwise direction, the serrated socket 58 readily receives the hexagonal shouldered stud 22*a* preventing rotation of the stud 22*a* in the bushing 20*a***.

An advantage of this modified design is that the engagement of the hexagonal shoulder 60 with the serrated socket 58 causes the bushing to break loose when the fastener is opened and facilitates retracting the bushing. This feature becomes important on aircraft operating under adverse atmospheric conditions, such as salt spray where the bushing and panel may have a tendency to freeze together.

Since certain other obvious modifications may be made in the device without departing from the scope of the invention, it is intended that all matters contained herein be interpreted in an illustrative and not in a limiting sense.

I claim:

1. A retractable stud assembly for retention in an opening in a first panel and the like for extending through an aligned opening in an associated panel into engagement with a socket carried by said associated panel over said aligned opening, said retractable stud assembly comprising a cylindrical bushing having an axially extending bore extending therethrough and adapted to be positioned in the opening of said first panel in slidable relationship therewith, said cylindrical bushing having an outwardly flared rim portion at one end thereof of a diameter greater than that of the panel opening, the opposite end of said cylindrical bushing having a radially projecting stop portion, and a retaining ring carried by said bushing between the under surface of said first panel member and said stop portion whereby said cylindrical bushing will be retained with the panel opening in slidable yet nondetachable relationship therewith, a bolt extending through said axially extending bore of said cylindrical bushing, the diameter of the shank and threaded portion of said bolt being less than that of the internal diameter of said bore of said cylindrical bushing whereby said bolt is capable of axial movement within said bushing, and an elongated cylindrical spring retainer bushing disposed within the bore of said cylindrical bushing between said bushing and said bolt, said retainer bushing having an inwardly and axially extending, longitudinally arcuate, resilient, spring arm means for engagement with the threads of said bolt to releasably retain same in a retracted position in said cylindrical bushing.

2. A retractable stud assembly in accordance with claim 1, wherein the spring arm means simultaneously engage a multiplicity of the crests of the threads on said bolt when said spring retainer bushing is in engagement with the threaded portion of said bolt.

3. A fastening device for attaching a panel member to another panel member through aligned apertures therein comprising a retractable stud assembly retained in the aperture of said first panel member and positioned therein for axial movement with respect thereto, said stud assembly including a cylindrical bushing having an axially extending bore extending therethrough positioned in the panel aperture, said cylindrical bushing having an outwardly flared rim portion at one end thereof of a diameter greater than that of the panel aperture, the opposite end of said cylindrical bushing having an annular groove, one wall of the groove facing said rim to provide a stop shoulder, and the other wall of the groove being inclined outwardly to merge with the external surface of the bushing, and a contractable resilient retaining ring carried by said bushing between the under surface of said panel member and said stop shoulder, said ring being slidable along said bushing and contractable in the said groove to engage said stop shoulder, the external diameter of said ring in said contracted position being larger than the diameter of the panel aperture whereby said cylindrical bushing is retained within the panel aperture in nondetachable but relatively slidable relationship therewith, a bolt extending through said axially extending bore of said cylindrical bushing, the diameter of the shank and the threaded portion of said bolt being less than that of the internal diameter of the bore of said cylindrical bushing whereby said bolt is capable of axial movement within said bushing, and an elongated spring retainer bushing disposed within the bore of said cylindrical bushing between said bushing and said bolt, means retaining said retainer bushing in said cylindrical bushing, said retainer bushing having formed therefrom an inwardly and axially extending, longitudinally arcuate, resilient, spring arm means for engagement with the threads of said bolt to releasably retain said bolt in a retracted position in said cylindrical bushing; a socket member secured to the free face of said second panel member and having an open end in alignment with the aperture in said second panel member, said socket member including a hollow cylindrical casing extending outwardly from said free face of the second panel member, a cylindrical nut retaining bushing positioned within said hollow casing, said nut retaining bushing having an internal diameter greater than the external diameter of the cylindrical bushing, and a freely movable nut disposed between the lower free end of said nut retaining bushing and the bottom of said hollow casing for engagement with the threaded portion of said bolt to lock the panel member and support member in tight engagement.

References Cited in the file of this patent

UNITED STATES PATENTS

| | | |
|---|---|---|
| 1,251,676 | McCaffray | Jan. 1, 1918 |
| 2,360,274 | Rapp | Oct. 10, 1944 |
| 2,391,232 | Farrell | Dec. 18, 1945 |
| 2,567,884 | Heath | Sept. 11, 1951 |
| 2,630,121 | Niemann | Mar. 3, 1953 |
| 2,640,245 | Becker | June 2, 1953 |
| 2,662,260 | Marschner | Dec. 15, 1953 |
| 2,720,905 | Bessom | Oct. 18, 1955 |
| 2,737,222 | Becker | Mar. 6, 1956 |
| 2,761,484 | Sternick | Sept. 4, 1956 |
| 2,767,950 | Bellon | Oct. 23, 1956 |

FOREIGN PATENTS

| | | |
|---|---|---|
| 604,017 | Great Britain | June 28, 1948 |